United States Patent
Yamaguchi

(10) Patent No.: US 10,317,305 B2
(45) Date of Patent: Jun. 11, 2019

(54) DYNAMOMETER-USE CALIBRATION DEVICE, WEIGHT FOR DYNAMOMETER-USE CALIBRATION DEVICE, WEIGHT SHAFT FOR DYNAMOMETER-USE CALIBRATION DEVICE, AND STOWAGE BOX FOR WEIGHT FOR DYNAMOMETER-USE CALIBRATION DEVICE

(71) Applicant: MEIDENSHA CORPORATION, Tokyo (JP)

(72) Inventor: Naoto Yamaguchi, Kumagaya (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/778,342

(22) PCT Filed: Sep. 14, 2016

(86) PCT No.: PCT/JP2016/077035
§ 371 (c)(1),
(2) Date: May 23, 2018

(87) PCT Pub. No.: WO2017/090302
PCT Pub. Date: Jun. 1, 2017

(65) Prior Publication Data
US 2018/0328806 A1     Nov. 15, 2018

(30) Foreign Application Priority Data
Nov. 25, 2015   (JP) .................. 2015-229347

(51) Int. Cl.
G01L 25/00     (2006.01)
G01L 3/00      (2006.01)
G01M 17/007    (2006.01)

(52) U.S. Cl.
CPC .............. G01L 25/003 (2013.01); G01L 3/00 (2013.01); G01L 25/00 (2013.01); *G01M 17/007* (2013.01)

(58) Field of Classification Search
CPC ..... G01L 25/003; G01L 25/00; G01L 25/006; G01L 3/00
(Continued)

(56) References Cited

U.S. PATENT DOCUMENTS

| | | | |
|---|---|---|---|
| 1,663,103 A | 3/1928 | Thompson | |
| 2005/0103688 A1* | 5/2005 | McHenry | ............... B03C 1/145 209/223.2 |
| 2015/0184982 A1 | 7/2015 | Peters et al. | |

FOREIGN PATENT DOCUMENTS

| | | | |
|---|---|---|---|
| CN | 201280037 | * | 7/2009 |
| JP | 52-119860 U | | 9/1977 |

(Continued)

*Primary Examiner* — Robert R Raevis
(74) *Attorney, Agent, or Firm* — Foley & Lardner LLP

(57) ABSTRACT

There are provided weight shaft 10 to be connected with arm 1a of dynamometer 1, weight placement section 11 supported by weight shaft 10 and weights 21 to be stacked on weight placement section 11. Weight shaft 10 includes constricted segment K at a predetermined position in the axial direction. Each weight 21 includes a cutout portion 24 cut out from a middle of a side end portion 22a and arranged to receive the constricted segment K. The cutout width of this cutout portion 24 is greater at a round hole 25 than at an open end 26b. Weights 21 are stacked on weight placement section 11 by lowering each weight in the state in which the constricted segment is inserted from the open end 26b into the round hole 25.

12 Claims, 8 Drawing Sheets

(58) Field of Classification Search
USPC .............................. 73/1.08–1.11, 1.13, 1.15
See application file for complete search history.

(56) References Cited

FOREIGN PATENT DOCUMENTS

JP           8-304211 A     11/1996
WO    WO 2014-186474 A1    11/2014

* cited by examiner (a)

(b)

(a)

(b)

(a)

(b)

(a)

(b)

(c)

DYNAMOMETER-USE CALIBRATION DEVICE, WEIGHT FOR DYNAMOMETER-USE CALIBRATION DEVICE, WEIGHT SHAFT FOR DYNAMOMETER-USE CALIBRATION DEVICE, AND STOWAGE BOX FOR WEIGHT FOR DYNAMOMETER-USE CALIBRATION DEVICE

TECHNICAL FIELD

The present invention relates to calibration apparatus or device for performing torque calibration of a device for measuring force, torque or power (dynamometer), weight or plumb for the calibration apparatus, shaft for hanging the weight or weights and stowage box for carrying the weight(s).

BACKGROUND ART

In general, a dynamometer is arranged to sense a repulsion torque acting between a rotor and a swing frame, with a load measuring device (such as load cell) through a torque arm provided in the swing frame, and to measure its driving, absorbing power. The dynamometer is provided with a torque calibration apparatus to perform periodical inspection and correction as to whether the measuring accuracy is invariably maintained.

As shown in FIG. 8(a), a torque calibrating apparatus of a patent document 1 includes a weight shaft 2 connected with a calibration arm is of a dynamometer 1, a weight placement section 3 supported by the weight shaft 2, and a load measuring device 5 disposed between a torque arm 1b and a fixing portion 6. Weights 4 are stacked or piled one by one on the weight placement section 3, and the torque is calibrated from the output of load measuring device 5.

The load of weights stacked one by one on the weight placement section 3 is compared with the indicated load of load measuring device 5, and the torque calibration is performed by checking whether the indicated load of the load measuring device 5 is within an allowable range.

Each of the weights 4 is in the form of a flat plate having a substantially rectangular shape, and formed with a cutout portion 9 between sides 4a and 4c forming the longer sides of the rectangular shape, as shown in FIG. 8(b). The cutout portion 9 extends from the middle of the side 4a toward the opposite side 4c. Each weight 4 is stacked on the weight placement section 3 in the state in which the weight shaft 2 is inserted into the cutout portion 9.

PRIOR ART DOCUMENT

Patent Document

Patent Document 1: JP H08-304211 A

SUMMARY OF THE INVENTION

Problems to be Solved by the Invention

Conventional example such as a system of the patent document 1 might encounter the following problems at the time of operation of loading and unloading the weights 4.

(1) In FIG. 8(b), "L" represents the length of the sides 4b and 4d forming the shorter sides of the weight 4, "L1" represents the depth of cutout portion 9, and "L2" represents the length from the cutout portion 9 to the opposite side 4c.

In this example, "L1>L2", and the cutout portion 9 is cut out deeper beyond the center of weight 4. Accordingly, when the weights 4 are stacked by inserting operation of inserting the weight shaft 2 into the cutout portions 9 from one direction, the stack of weights 4 would become unstable and the weights might slip down, so that the safety of the operation might be impaired.

(2) Therefore, in the conventional system, to maintain the balance of the stack of weights and improve the safety, the weights 4 are stacked by a so-called cross stacking way of stacking the weights 4 alternately from two directions so that the weights 4 are fit over the weight shaft 2 from the two directions alternately.

Specifically, the weight 4 is fit over the weight shaft 2 from one direction in a first inserting operation and then the next weight 4 is moved 180 degrees and fit over the weight shaft 2 from the opposite direction. By repeating these operations, the weights 4 are stacked in an alternating state as shown in FIG. 8(c).

However, the stacking operation from the two opposite direction is often difficult because of the space for the operation limited by the size of a building or other factors. In such a case, there is no choice but to stack the weight in one direction, so that the stack of weight might become unstable and the safety might be lost in the loading and unloading operations.

It is an object of the present invention to improve the stability of a stack of weights and the safety in operations of loading and unloading the weights without resort to the cross-stacking.

Means for Solving the Problems

One aspect of the present invention relates to a calibration apparatus for a dynamometer, the calibration apparatus comprising a weight shaft to be connected with an arm of the dynamometer; a weight placement section supported by the weight shaft; and one or more weights to be stacked on the weight placement section; and the calibration apparatus being arranged to perform torque calibration by comparison between a load of the weights and an indicated load of a load measuring device. The weight shaft of this calibration apparatus includes a constricted segment or neck at a predetermined position or any position in an axial direction of the weight shaft; each weight includes a cutout portion which is cut out from a middle of an end portion of the weight to a central region around the center of the weight or approximately at the center of the weight and adapted to be introduced onto the constricted segment so that the constricted segment is inserted in the cutout portion of the weight. The cutout portion is so formed that a cutout width of the cutout portion in the central region of the weight is greater than or equal to an outside diameter of a remaining segment of the weight shaft other than the constricted segment, and the cutout width in a region adjacent to the middle of the end portion is greater than or equal to an outside diameter of the constricted segment and smaller than or equal to the outside diameter of the remaining segment.

Another aspect of the present invention relates to at least one weight for a calibration apparatus of a dynamometer, to be stacked on a weight placement section supported through a weight shaft by an arm of the dynamometer at a time of torque calibration by the calibration apparatus. This weight comprises a cutout portion which is cut out from a middle of an end portion of the weight to a central region of the weight and adapted to be introduced onto a constricted segment of the weight shaft so that the constricted segment is inserted in the cutout portion of the weight. The cutout portion is so formed that a cutout width of the cutout portion in the central region of the weight is greater than or equal to an outside diameter of a remaining segment of the weight shaft other than the constricted segment, and the cutout width in a region adjacent to the middle of the end portion is greater than or equal to an outside diameter of the constricted segment and smaller than or equal to the outside diameter of the remaining segment.

Still another aspect of the present invention relates to a weight shaft to support a weight placement section on which weights are stacked at a time of torque calibration, on an arm of a dynamometer of a calibration apparatus. This weight shaft comprises: a shaft main body having a first end to be connected with the arm and a second end fixed with the weight placement section, and a constricted segment formed at a predetermined position in an axial direction of the shaft main body.

Still another aspect of the present invention relates a stowage box for receiving or storing a weight or weights for a calibration apparatus of the dynamometer. This stowage box comprises: grips provided in each of both sides of the storage box; and a partition to restrain movement of the weight received in the box.

MODES FOR CARRYING OUT THE INVENTION

Figure 1:
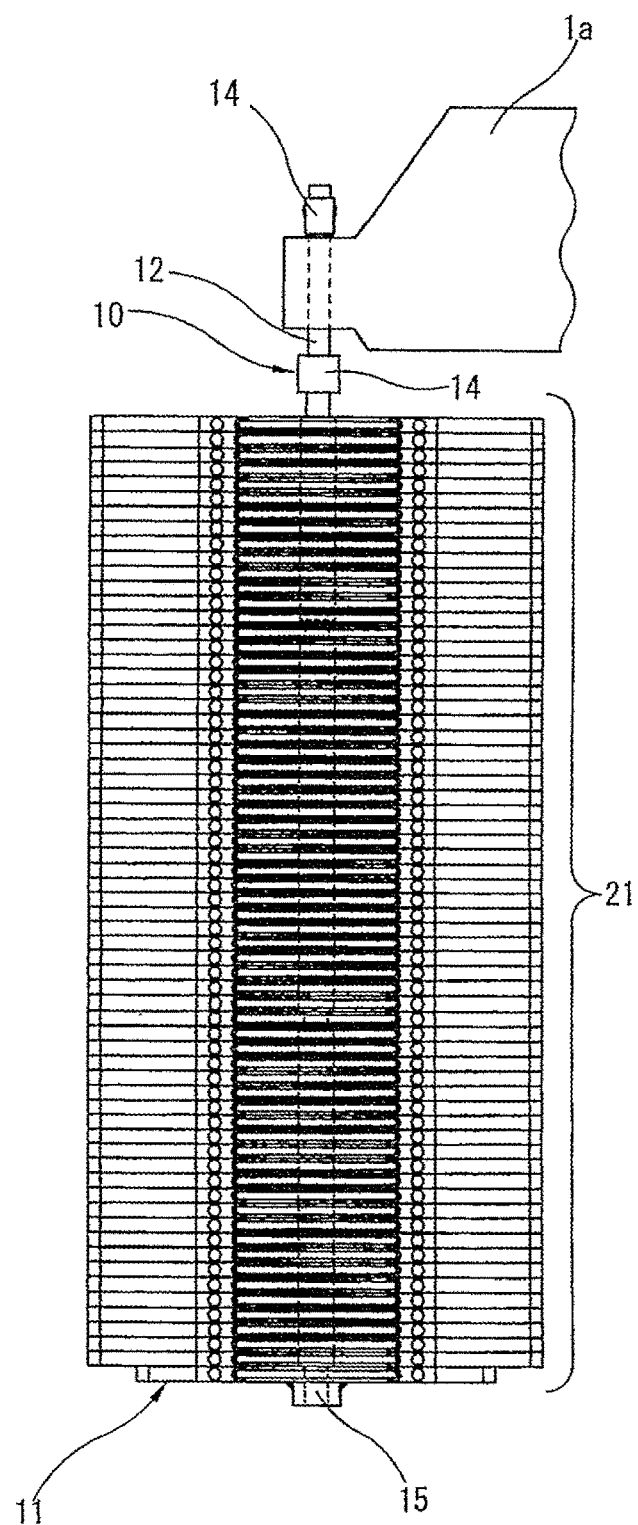
FIG. 1 is a side view showing weights stacked on a weight placement section supported by a weight shaft, according to an embodiment of the present invention.

Following is explanation on one embodiment of the present invention. The same reference numerals are used for parts which are the same as those in patent document 1. As shown in FIG. 1, a dynamometer-use calibration apparatus according to this embodiment includes a weight shaft 10 to be connected with a calibration arm 1a of a dynamometer 1, a weight placement section 11 supported by the weight shaft 10, and weights 21 to be stacked on the weight placement section 11.

There is further provided a load measuring device 5 disposed between the torque arm 1b of dynamometer 1 and a fixing portion 6 as in the patent document 1. The torque calibration is performed by using the output of the load measuring device 5 (such as load cell) and the weights stacked on the weight placement section 11.

Specifically, the torque calibration is performed by comparing the load of weights 21 stacked on the weight placement section 11 with the indicated load of the load measuring device 5, and checking whether the indicated load of the torque measuring device 5 is within the predetermined allowable range. In this embodiment, however, the weight shaft 10 and the weights 21 are different from those of the patent document 1. The embodiment is hereinbelow explained mainly on the weight shaft 10 and weights 21.

<<Weight Shaft 10>>

Figure 2:
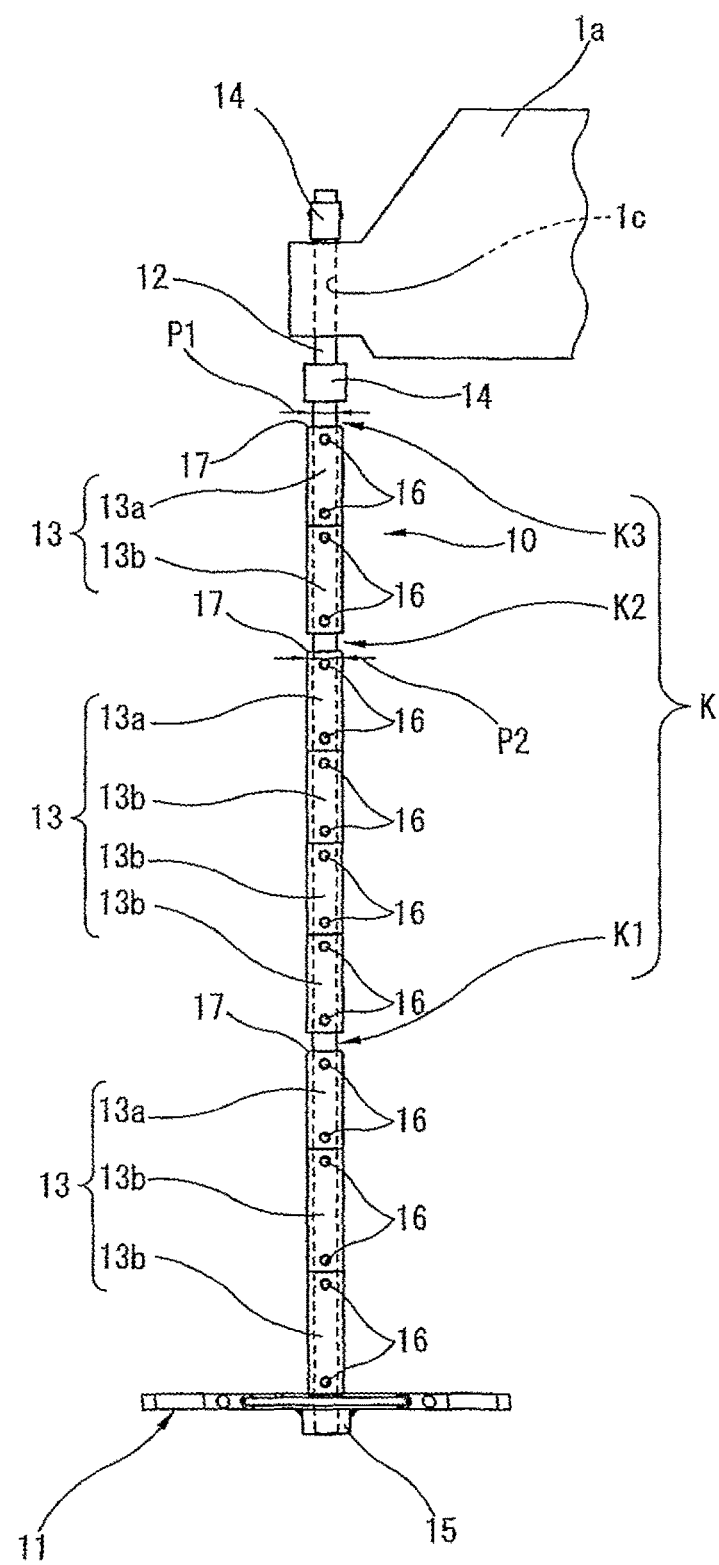
FIG. 2 is a side view showing the weight shaft and the weight placement section.

FIG. 2 shows an example of the weight shaft 10. The weight shaft 10 of this example includes a shaft main body 12 and a group of collars 13. The shaft main body 12 is a single shaft for supporting the weight placement section 11 to the calibration arm 1a. The collars 13 are mounted on the shaft main body 12 so that the shaft main body 12 is inserted through the collars 13.

Each of the upper end and lower end of shaft main body 12 includes an outside surface formed with external teeth. The upper end of shaft main body 12 is inserted through a through hole 1c of the calibration arm 1a and connected with the calibration arm 1a with two tubular nuts 14.

This shaft main body 12 is equipped with an upper group of collars 13, an intermediate group of collars 13 and a lower group of collars 13. In this example, the outside surface of shaft main body 12 is bared at a segment between the nut 14 on a lower side and the upper group of collars 13, and segments between the adjacent groups of collars 13.

In FIG. 2, "P1" represents an outside diameter of the shaft main body 12, and "P2" represents an outside diameter of the collars 13, A relationship of P1<P2 holds. The exposed shaft segments serve as constricted segment(s) or neck(s) K having a smaller outside diameter. In this example, the weight shaft 10 has three constricted segments K at three positions in the axial direction of shaft main body 12. In FIG. 2, three constricted segments K1, K2 and K3 are arranged from the lower position.

In FIG. 2, each group of collars 13 includes an uppermost collar 13a at an uppermost position, and one or more collars 13b at intermediate or lower positions. Each of these collars 13a and 13b is a tubular member shaped like a hollow cylinder and formed with a through hole (not shown) through which the shaft main portion 12 is inserted. Each collar includes a circumferential wall formed with upper and lower internally threaded holes (not shown). The collar 13a at the uppermost position includes an upper end having an outer circumference 17 which is chamfered. In this point, the collar 13a is different from the other collars 13b.

Each of the collars 13a and 13b is fixed to the shaft main body 12 with set screws or locking screws 16 screwed into the above-mentioned internally threaded holes and clamping the outside circumferential surface of shaft main body 12. Accordingly, it is possible to release the collars 13a and 13b by loosening the set screws 16 and to move the collars 13a and 13b up and down. Therefore, it is possible to adjust the positions of the constricted segments K1~K3 by fixing the collars 12a and 13b again by tightening the set screws 16.

The weight placement section 11 includes a base member 18 in the form of a substantially rectangular flat plate and hand grips 19 shaped like the letter C and attached to both sides, respectively, as shown in FIG. 3(a). At the center of the base member 18, there is formed an insertion hole 20 arranged to receive the lower end of shaft main body 12 of the weight shaft 10.

Figure 3:
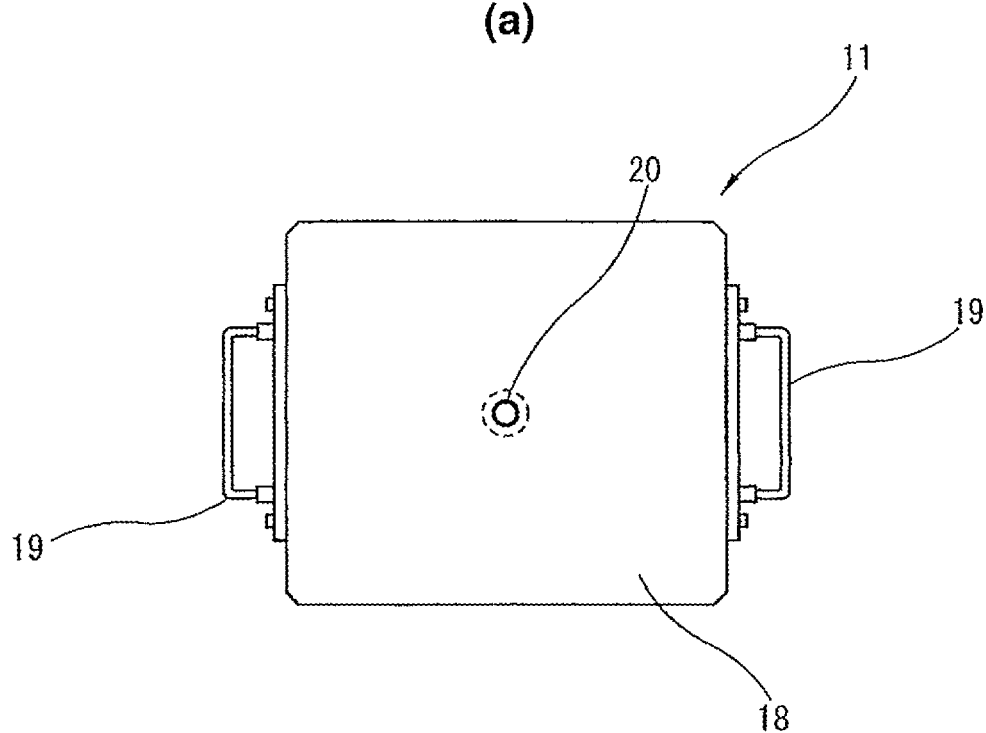
FIG. 3(a) is a front view showing the weight placement section.
FIG. 3(b) is a side view of the weigh placement section.
Figure 3:
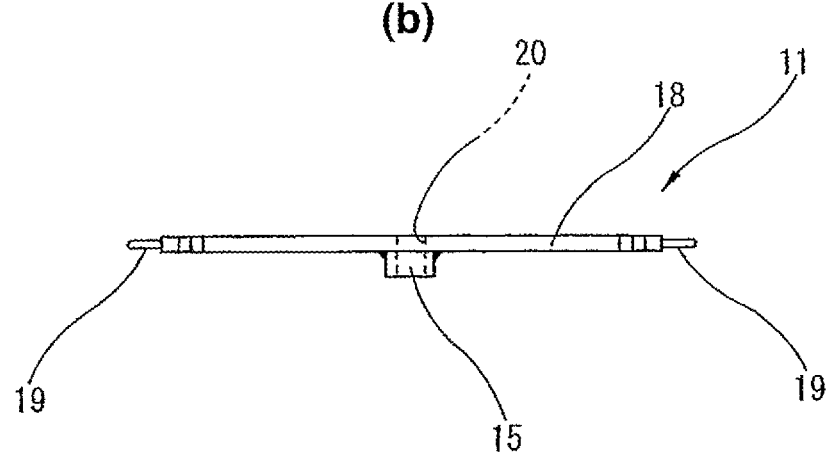

This insertion hole 20 is continuous with the inside hole of a nut 15 fixed to the lower side of the base member 18, as shown in FIG. 3(*b*). The lower end of shaft main body 12 is inserted through the insertion hole 20 and fastened to the base member 18 with the nut 15. In this way, the weight placement section 11 is fixed to the lower end of shaft main body 12.

<<Weights 21>>

Figure 4:
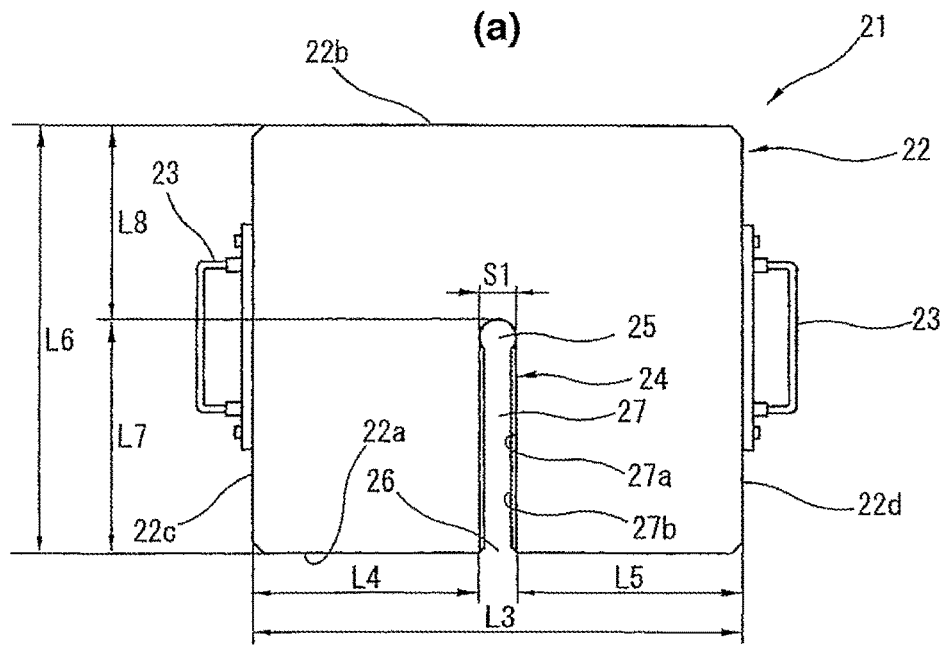
FIG. 4(a) is a front view showing a weight.
FIG. 4(b) is a side view of the weight.
FIG. 4(c) is an enlarged view of a portion of FIG. 4(b).
Figure 4:
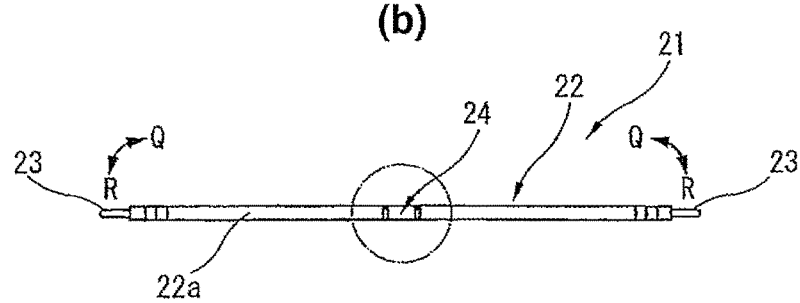
Figure 4:
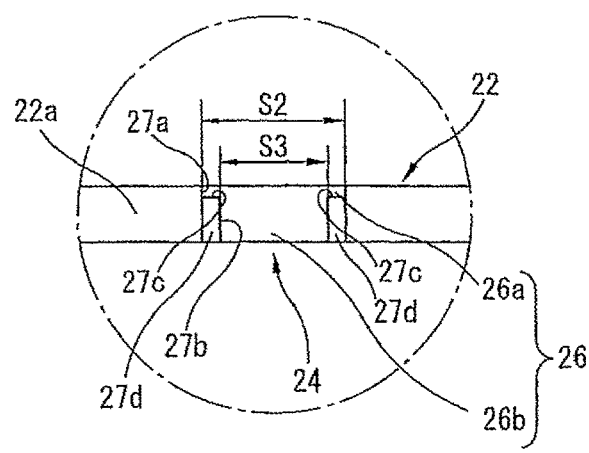
Figure 5:
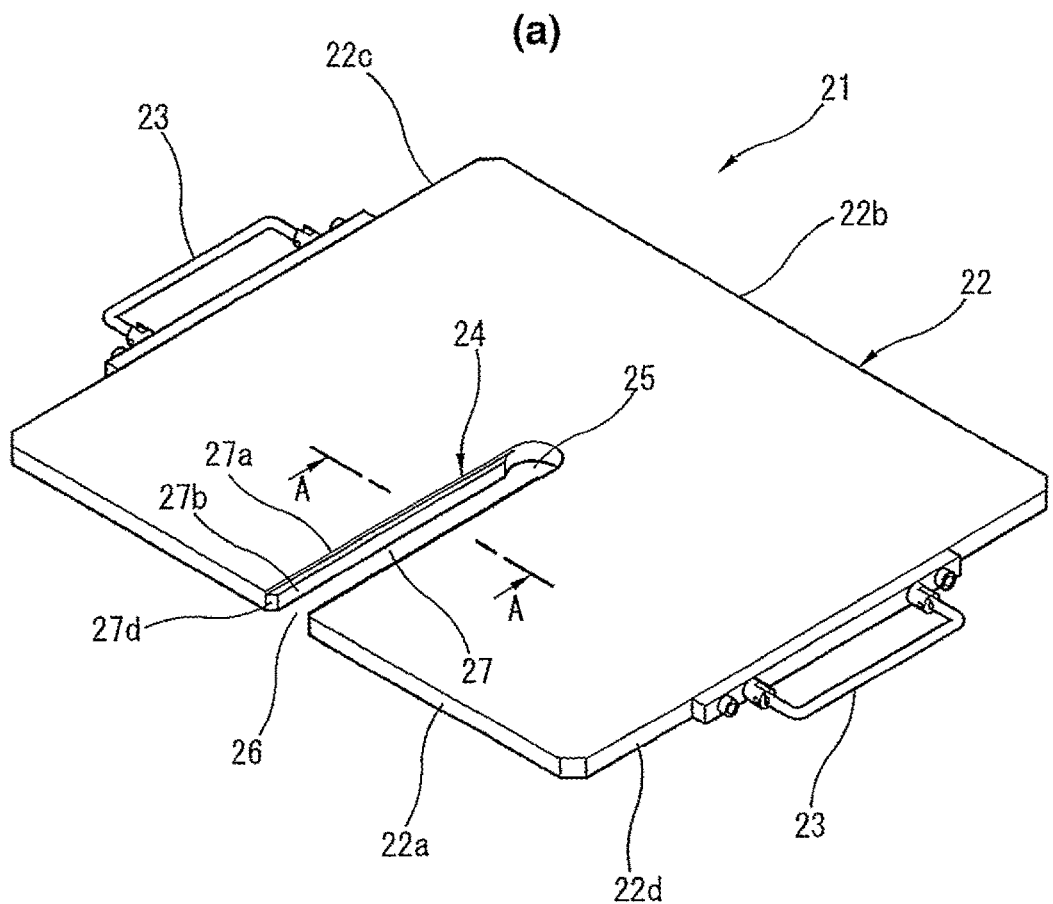
FIG. 5(a) is a perspective view of the weight.
FIG. 5(b) is a sectional view taken across a line A-A in FIG. 5(a).
Figure 5:
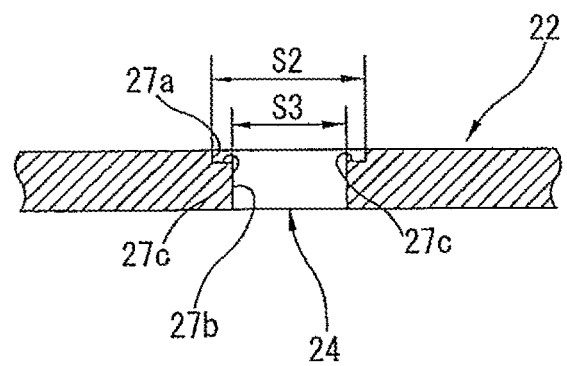

FIGS. 4 and 5 show a construction example of the weights 21. The weight 21 as shown in FIG. 4(*a*) and FIG. 5(*a*) includes a weight main body 22 in the form of a substantially square flat plate, and hand grips 23 attached, respectively, to side portions 22*c* and 22*d* of the weight main body 22 on both sides, shaped like the letter U and arranged to be tiltable. The wall thickness of weight main body 22 is slightly smaller than the axial length of the constricted segments K1~K3 (the length between collars 13*a*, 13*b*). Each grip 23 can be raised in a direction of arrow Q shown in FIG. 4(*b*) and inclined in a direction of arrow R.

The weight main body 22 is formed with a cutout portion 24 into which one of the constricted segment K of shaft main body 12 is inserted. In FIG. 4(*a*), "L3" represents the length of side end portions 22*a* and 22*b* of weight main body 22, and "L4" and "L5" represent the length from the cutout portion 24 to side end portion 22*c* and the length from the cutout portion 24 to side end portion 22*d*, respectively. In this example, L4=L5. Thus, the cutout portion 24 extends from an open end or opening 26 located at the middle of the end portion 22*a*, toward the opposite end portion 22*b*.

Furthermore, in FIG. 4(*a*), "L6" represents the length of side portions 22*c* and 22*d*, "L7" represents the depth of cutout portion 24, and "L8" represents the distance from the cutout portion 28 to the opposite end portion 22*b*. In this example, L7 is approximately equal to L8, "L7≈L8". The cutout portion 24 is cut out from the open end 26 to a closed end located in a central region (or substantially at the center) of the weight main body 22. From the viewpoint of the stability of stacked weights 21, the cutout portion 24 is preferably cut out to the position of the center of gravity of weight main body 22.

In this example, the cutout portion 24 includes a round hole 25 opened in the central region of weight main body 22 (preferably at the center of gravity of weight main body 22), and a slit or long hole 27 extending from the open end 26 to the round hole 25. The round hole 25 forms the bottom or closed end of cutout portion 24 extending from the open end 26. The slit 27 serves as a guide slit or guide passage for guiding the mating constricted portion K from the open end 26 to the round hole 25 at the time of inserting operation.

The slit 27 has a stepped structure of upper and lower steps, as shown in FIGS. 4(*b*) and 4(*c*). That is, the long hole 27 includes an upper slit 27*a* on an upper surface's side and a lower slit 27*b* on a lower surface's side. A shoulder surface 27*c* is formed between upper slit 27*a* and lower slit 27*b*, so as to form a step. End surfaces 27*d* defining the open end of the lower slit 27*b* are inclined to form a tapered form.

The widths or cutout widths of round hole 25, and upper and lower slits 27*a* and 27*b* are illustrated in FIGS. 4(*a*) and 4(*c*) and FIG. 5(*b*). In FIG. 4(*a*), "S1" represents the width or cutout width of round hole 25. In FIG. 4(*c*) and FIG. 5(*b*), "S2" represents the width or cutout width of upper slit 27*a* and "S3" represents the width or cutout width of lower slit 27*b*.

In this example, "S1=S2" and the cutout width of round hole 25 is equal to the cutout width S2 of upper slit 27*a*. Furthermore, "S3<S1" and "S3<S2". Accordingly, the cutout width S3 of lower slit 27*b* is smaller (narrower) than the cutout width S1 of round hole 25 and smaller (narrower) than the cutout width S2 of upper slit 27*a*.

As to the relation with the outside diameters P1 and P2 of weight shaft 10, "S1, S2>P2", and accordingly each of the cutout widths S1 and S2 of round hole 25 and upper slit 27*a* is greater (wider) than the outside diameter P2 of collars 13*a* and 13*b*.

Furthermore, "S3>P1" and "S3<P2". Accordingly, the cutout width S3 of lower slit 27*b* is greater (wider) than the outside diameter P1 of constricted segments K, but smaller (narrower) than the output diameter P2 of collars 13*a* and 13*b*. The cutout width S3 may be greater than or equal to the outside diameter P1 and smaller than or equal to the outside diameter P2.

<<Stacking Operation>>

Figure 6:
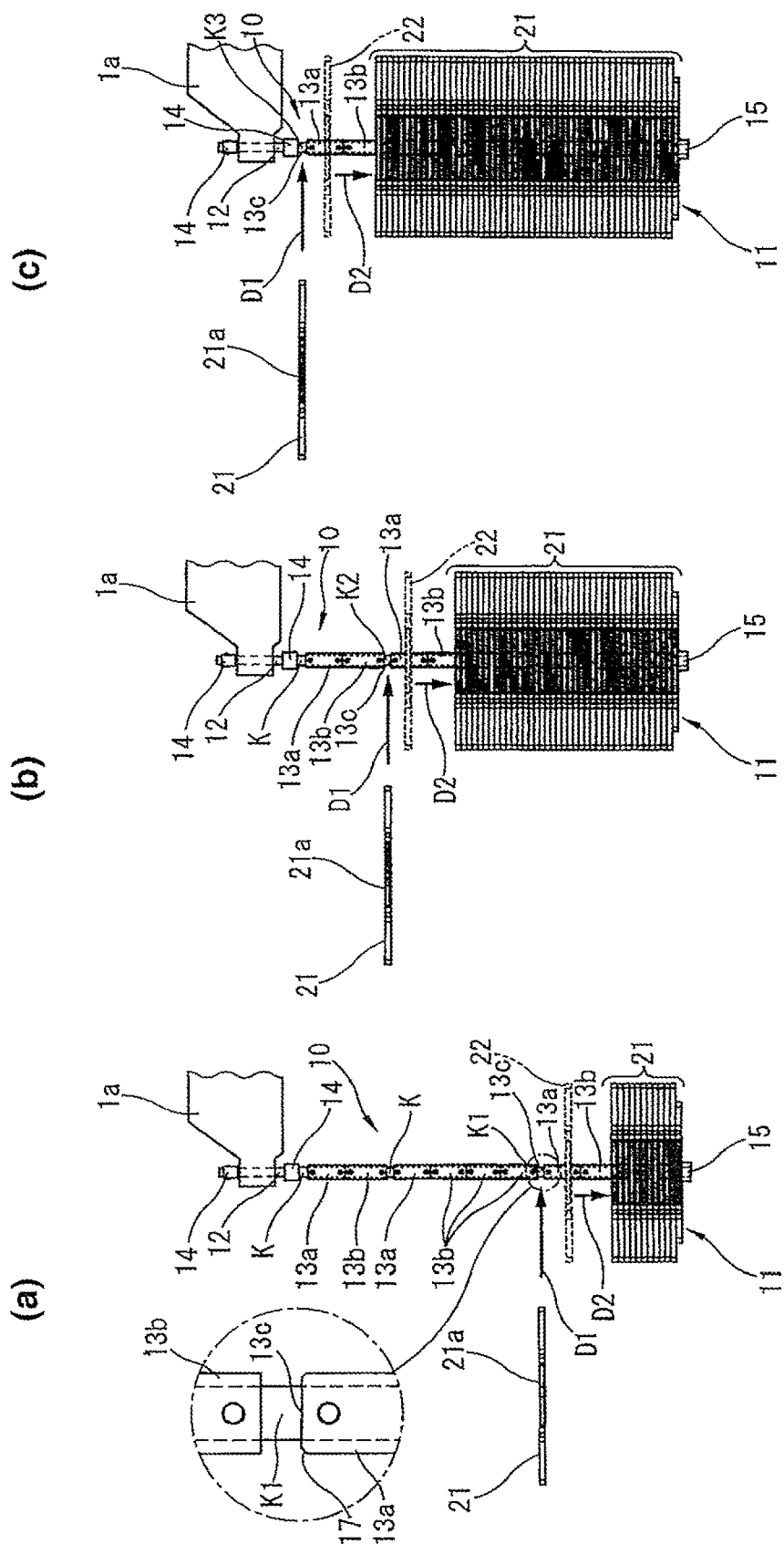
FIG. 6(a) is a side view showing a stacking operation of weights through a constricted segment at a lower level.
FIG. 6(b) is a side view showing a stacking operation of weights through a constricted segment at a middle level.
FIG. 6(c) is a side view showing a stacking operation of weights through a constricted segment at a upper level.

An operation of stacking the weights 21 on the weight placement section 11 is illustrated in FIG. 6. The hand grips 23 can be raised in the direction Q shown in FIG. 4(*b*), at the time of stacking operation, so that the weights 21 are easy to hold and carry and advantageous for improvement of operation efficiency.

As shown by an arrow D1 in FIG. 6(*a*), the weight 21 is lifted up and fitted over the lowermost constricted segment K1 so that the lowermost constricted segment K1 is inserted from the open end 26*b*, to the round hole 25 while being guided by the lower slit 27*b*. This inserting operation is facilitated by the chamfered upper end circumference of the collar 13*a* immediately below the lowermost constricted segment K1 and the tapered open end surfaces 27*d* of weight 21.

Moreover, the shoulder surface 27*c* between the upper and lower slits 27*a* and 27*b* abuts on the lower end of collar 13*b* located just above the constricted segment K1 during insertion of the constricted segment K1 into the lower slit 27*a*, and thereby facilitates the positioning at the time of inserting operation.

Moreover, the hand grips 23 are released from the hand hold during the inserting operation, the inner end of lower slit 27*b* is placed on the upper end 13*c* of collar 13*a*. This structure can prevent fall of the weight 21, and thereby secure the safety in the loading and unloading operations.

After the inserting operation, the weight 21 can be lowered as shown by an arrow D2 because the cutout width S1 of round hole 25 is greater than the outside diameter P2 of collars 13*a* and 13*b*. Therefore, the weight 21 is placed on the weight placement section 11. By repeating these operations, the weights 21 are stacked up to the level of constricted segment K1. The hand grips 23 of each weight 21 can be laid down in the direction R after the placement, to prevent hands from being caught or squished during the stacking operation.

If the surface 21*a* of weight 21 of the stack formed as shown in FIG. 6(*a*) becomes flush with the upper end 13*c* of the collar 13*a* so as to form a flat surface, the next stacked weight 21 might slip off since the slit 27 of the next weight 21 might become parallel or aligned with the constricted segment K1. Therefore, to produce a positional difference or misregistration between 13*c* and 21*a*, the height of the constricted segment K1 or the position of collar 13*a* is adjusted preliminarily. For this positional adjustment, there is formed, between the collars 13*a* and 13*b*, a gap or clearance for adjustment.

Next, as shown in FIG. 6(b), through the constricted segment K2 at the middle level, the weight 21 is stacked by insertion from the open end 26b of the weight 21 to the round hole 25. Operations similar to the operations shown in FIG. 6(a) (including the positional adjustment of the collar 13a) are carried out.

Finally, as shown in FIG. 6(c), through the constricted segment K3 at the upper level, the weight 21 is stacked by insertion from the open end 26b of the weight 21 to the round hole 25. Operations similar to the operations shown in FIG. 6(a) are carried out. However, the stacking operation is ended when the weights 21 are stacked to the level of constricted segment K3. Therefore, there is no need for the position adjustment of the collar 13a.

Thus, according to this embodiment, it is possible to stack the weights 21 by the inserting operation from the direction D1. That is, the weights 21 can be stacked by the inserting operation from one direction. One of the collars 13a and 13b is inserted in the round hole 25 of each of the stacked weights 21. The round hole 25 is located in the vicinity of the center of the weight 21 (preferably at the center of gravity of the weight 21). Therefore, the stack of weights 21 is superior in the weight balance and hence advantageous for the stability.

Moreover, the setting of the cutout width S3 of the lower slit 27b smaller than the outside diameter P2 of collars 13a and 13b functions to prevent extraction of the weights 21 from collars 13a and 13b. In other words, the lower slits 27b function to prevent the weights 21 from slipping off and to hold the weights 21 of the stack safely. Accordingly, it is possible to secure the safety in the loading and unloading operations.

Consequently, without the need for the so-called cross stacking as in the earlier technology, it is possible to secure the stability of the stack of weights 21 and the safety of the loading and unloading operations. This system is especially effective in the case in which the space for operations is limited by the restrictions in the size of a building. Moreover, because the weights 21 can be stacked from one direction, it is possible to improve the working efficiency as compared to the cross stacking operation of the earlier technology.

In the case of operation of unloading the weights 21, the grips 23 are raised in the direction Q as in the loading operation, and the weight 21 is lifted to the position of the constricted segment K3, and extracted from the constricted segment K3 through the slit 27. This extracting operation is repeated through the constricted segment K2 and then through the constricted segment K1.

Other Examples

The present invention is not limited to the above-mentioned embodiment. Various variations and modifications are possible within the scope of the claims. The following is explanation on examples.

Figure 7:
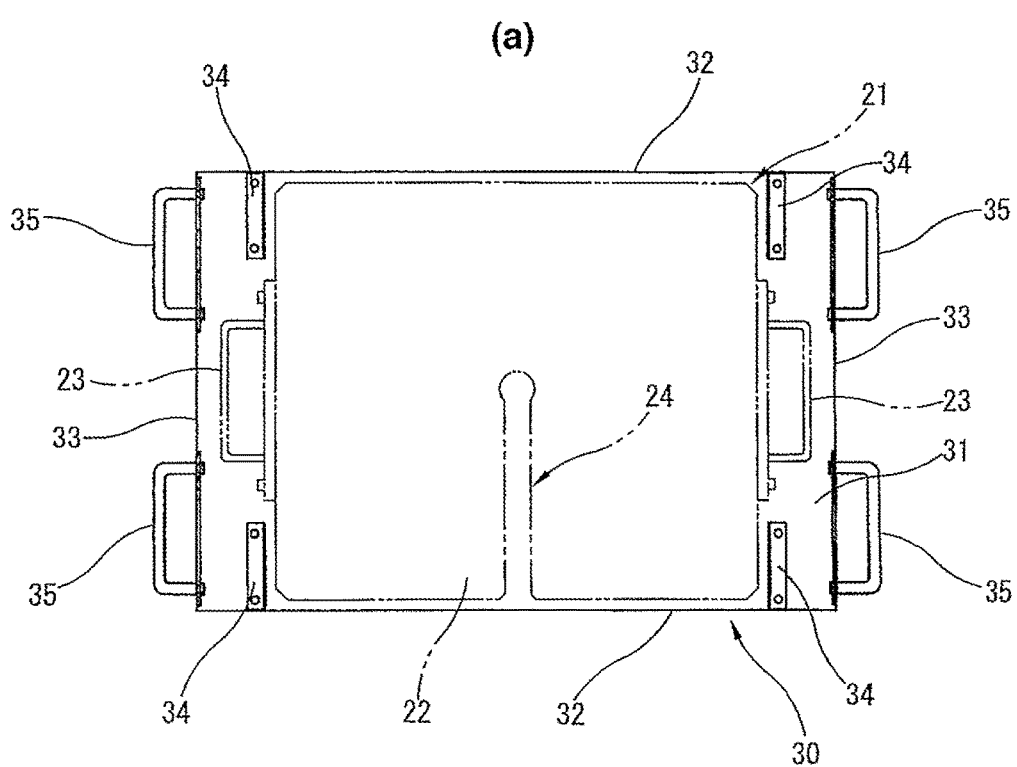
FIG. 7(a) is a front view of a storage box in which the weight is stored.
FIG. 7(b) is a side view of the storage box.
Figure 7:
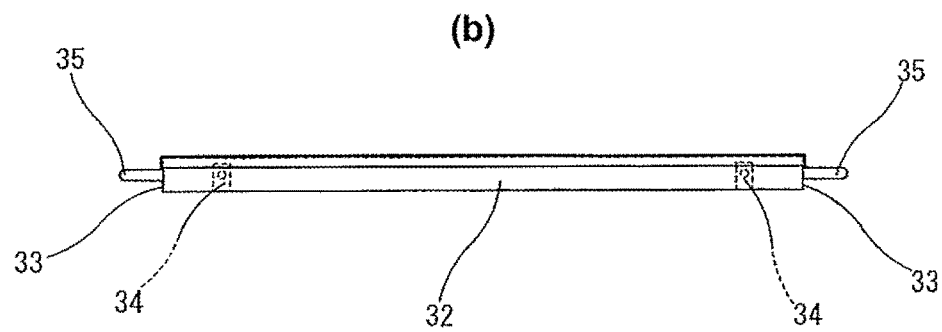
Figure 8:
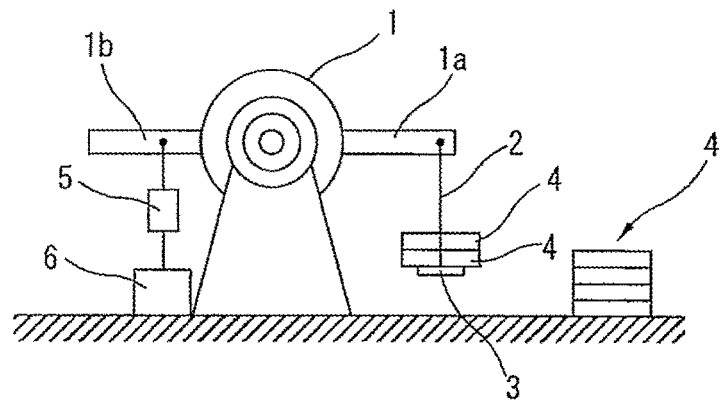
FIG. 8(a) is a schematic view showing a calibration apparatus of a dynamometer shown in patent document 1.
FIG. 8(b) is a plan view of a weight.
FIG. 8(c) is a side view showing a cross stack of weights.
Figure 8:
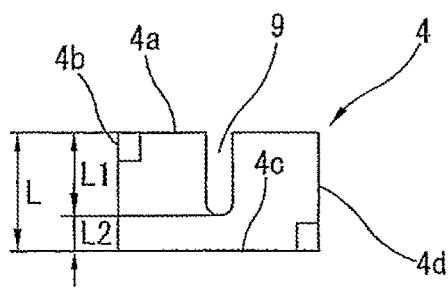
Figure 8:
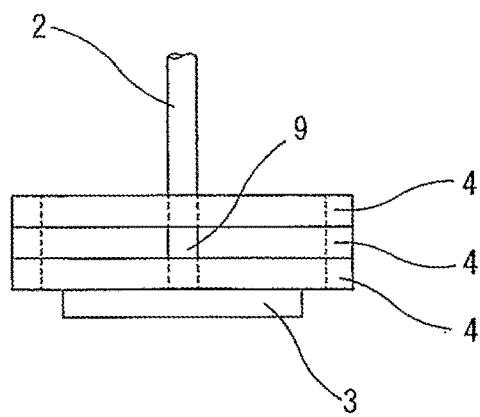

(1) Weights 21 can be stored and carried in a stowage box 30 as shown in FIG. 7. This stowage box 30 includes a base plate or bottom plate 31 having a substantially rectangular shape, four side plates 32 and 33 standing uprights from the outer edges of base plate 31, pairs of C-shaped hand grips 35, respectively, fixe to the side plates 33, and four partition plates or partitions 34 fastened to the base plate 31 by screw fasteners.

Each of the two side plates 33 is provided with two of the hand grips 35 for handling this stowage box 30 by two operators. Even when the weight of the box after the storage of weights is great, the weights 21 can be carried to a predetermined position by two operators.

The storage box 30 has the inside space adding allowances with respect to the lateral width (L3 in FIG. 4) of weights 21. This structure reduces the possibility of hand injury or bruise of operators at the time of loading the weights in the storage box 30. Moreover, weights 21 are placed in the inner region defined by the partition plates 34. Partition plates 34 limit movement of the weights 21 during carrying operation, and thereby facilitate the carrying operation of weights 21.

(2) In the illustrated example, the weight shaft 10 has three of the constricted segments K1, K2 and K3 arranged in the axial direction of the weight shaft 10. However, it is possible to increase or decrease the number of constricted segment or segments K appropriately according to the specifications and need.

(3) It is optional to omit the upper slit 27a of slit or long hole 27, and to set the cutout width of slit 27 at "S3" shown in FIG. 4(c) and FIG. 5(b) uniformly from the upper end to the lower end of slit 27. In this case, the slit 27 is in the form of a slit having a uniform cutout width (S3) and extending from the open end 26 to the round hole 25.

This structure, too, makes it possible to mount the weight on the weight shaft by insertion of one of the constricted segments K1~K3 from the open end 26 to the round hole 25, prevent extraction of the weights 21 by the slit 27, and thereby provide the same effects as in the illustrated example.

(4) In the case of slit 27 having the upper and lower slits 27a and 27b, it is not necessary to form the lower slit 27b entirely from the open end 26 to the round hole 25. It is possible to form the lower slit 27b partly in a region adjacent to the open end 26b.

(5) Moreover, in the case of forming the upper and lower slits 27a and 27b, it is possible to set the cutout width of upper slit 27a equal to "S3" and the cutout width of lower slit 27b equal to "S2". In this case, the upper slit 27a guides the insertion onto the constricted segment K, the constricted segment K after the insertion is located in the lower slit 27b, and the upper slit 27a prevents extraction of the weight.

(6) The collars 13a and 13b may be in the form of a cylindrical tube or may be in the form of a square or rectangular tube. In this case, the round hole 25 is formed in the shape corresponding to the cross sectional shape of the collars 13a and 13b.

EXPLANATION OF THE REFERENCE NUMERAL 1 dynamometer
1a calibration arm (arm)
1b torque arm
10 weight shaft
11 weight placement section
12 shaft main body
13a, 13b collar (tubular member)
14 tubular nut (tubular member)
16 set screw (externally threaded member)
21 weight
23, 25 grip
22a side end portion
25 round hole (cutout bottom, approximately center)
26 open end (middle of end portion)
27 slit (guide slit)
27a upper slit
27b lower slit 30 stowage box
34 partition
K1~K3 constricted segment
S1, S3 cutout width

The invention claimed is:

1. A calibration apparatus for a dynamometer, the calibration apparatus comprising:
a weight shaft to be connected with an arm of the dynamometer;
a weight placement section supported by the weight shaft; and
weights to be stacked on the weight placement section;
the calibration apparatus being arranged to perform torque calibration by comparison between a load of the weights and an indicated load of a load measuring device;
the weight shaft including a constricted segment at a predetermined position in an axial direction of the weight shaft;
each weight includes a cutout portion which is cut out from a middle of an end portion of the weight to a central region of the weight and adapted to be introduced onto the constricted segment so that the constricted segment is inserted in the cutout portion of the weight;
the cutout portion being so formed that a cutout width of the cutout portion in the central region of the weight is greater than or equal to an outside diameter of a remaining segment of the weight shaft other than the constricted segment;
the cutout portion including a guide slit guiding from an open end at the middle of the end portion to a bottom portion of the cutout portion in the central region;
the guide slit including an upper slit on an upper surface's side and a lower slit on a lower surface's side; and
the cutout width of one of the upper and lower slits being greater than or equal to the outside diameter of the constricted segment, and smaller than or equal to the outside diameter of the remaining segment.

2. A calibration apparatus for a dynamometer, the calibration apparatus comprising:
a weight shaft to be connected with an arm of the dynamometer;
a weight placement section supported by the weight shaft; and
weights to be stacked on the weight placement section;
the calibration apparatus being arranged to perform torque calibration by comparison between a load of the weights and an indicated load of a load meter;
the weight shaft including a constricted segment at a predetermined position in an axial direction of the weight shaft;
each weight includes a cutout portion which is cut out from a middle of an end portion of the weight to a central region of the weight and adapted to be introduced onto the constricted segment so that the constricted segment is inserted in the cutout portion of the weight;
the cutout portion being so formed that a cutout width of the cutout portion in the central region of the weight is greater than or equal to an outside diameter of a remaining segment of the weight shaft other than the constricted segment;
the cutout width in a region adjacent to the middle of the end portion is greater than or equal to an outside diameter of the constricted segment and smaller than or equal to the outside diameter of the remaining segment;
the weight shaft including
a shaft main body having a first end to be connected with the arm and a second end fixed with the weight placement section, and
a plurality of tubular members mounted on the shaft main body so that the main shaft body is inserted through the tubular members;
the constricted segment being formed among the tubular members.

3. A weight for a calibration apparatus of a dynamometer, to be stacked on a weight placement section supported through a weight shaft by an arm of the dynamometer at a time of torque calibration by the calibration apparatus, the weight comprising:
a cutout portion which is cut out from a middle of an end portion of the weight to a central region of the weight and adapted to be introduced onto a constricted segment of the weight shaft so that the constricted segment is inserted in the cutout portion of the weight;
the cutout portion being so formed that a cutout width of the cutout portion in the central region of the weight is greater than or equal to an outside diameter of a remaining segment of the weight shaft other than the constricted segment;
the cutout portion including a guide slit guiding from an open end at the middle of the end portion to a bottom portion of the cutout portion;
the guide slit including an upper slit on an upper surface's side and a lower slit on a lower surface's side; and
the cutout width of one of the upper and lower slits being greater than or equal to the outside diameter of the constricted segment, and smaller than or equal to the outside diameter of the remaining segment of the weight shaft.

4. A stowage system comprising:
the weight for the calibration apparatus as claimed in claim 3; and
a stowage box configured to receive the weight,
wherein the stowage box comprises
grips provided in each of sides of the storage box; and
a partition to restrain movement of the weight stored in the box.

5. The weight for the calibration apparatus as claimed in claim 3, wherein the weight further comprises a retractable grip on each side.

6. A stowage system comprising:
the for the calibration apparatus as claimed in claim 5; and
a stowage box configured to receive the weight,
wherein the stowage box comprises
grips provided in each of sides of the storage box; and
a partition to restrain movement of the weight stored in the box.

7. A weight shaft for hanging weights for a calibration apparatus of a dynamometer, from an arm of the dynamometer, the weight shaft comprising:
a shaft main body having an upper end connected with the arm and a lower end fixed with a weight placement section on which the weights are stacked at a time of torque calibration;
a constricted segment provided at a predetermined position in an axial direction of the shaft main body which extends vertically when the weight shaft hangs down from the arm of the dynamometer, and
a plurality of tubular members mounted on the shaft main body so that the main shaft body is inserted through the tubular members;

the constricted segment being formed among the tubular members.

8. The weight shaft as claimed in claim 7, wherein each of the tubular members includes a circumferential wall formed with an internally threaded hole, and attached to the shaft main body by an externally threaded member screwed into the internally threaded hole.

9. The weight shaft as claimed in claim 8, wherein the tubular members are arranged to adjust a position of the constricted segment by adjusting positions of the tubular members.

10. The weight shaft as claimed in claim 7, wherein the tubular members are arranged to adjust a position of the constricted segment by adjusting positions of the tubular members.

11. The weight shaft as claimed in claim 7, wherein the tubular members are shaped to define a greater cross sectional size of the weight shaft and to allow axial movement of each of the weights in an inserted state in which the weight shaft is inserted in a center hole formed in each of the weights and to prevent radial movement of each of the weights from the inserted state through a slit extending radially from the center hole in each of the weights, and the constricted segment is shaped to define a smaller cross sectional size smaller than the greater cross sectional size, and to allow the radial movement of each of the weights through the slit to mount or dismount each weight on or from the weight shaft.

12. A shaft assembly for a calibration apparatus of a dynamometer, the shaft assembly comprising:

the weight shaft as claimed in claim 7, wherein the weight placement section is fixed to the lower end of the shaft main body of the weight shaft and formed in a shape of a flat plate on which the weights are stacked at the time of torque calibration.

* * * * *